US005348608A

United States Patent [19]

Glenn et al.

[11] Patent Number: 5,348,608

[45] Date of Patent: Sep. 20, 1994

[54] CARPET STRIPPING DEVICE

[75] Inventors: Joe Glenn, Willard, Mo.; Roger McGuire, 514 S. Airwood, Springfield, Mo. 65802

[73] Assignee: Roger McGuire, Springfield, Mo.

[21] Appl. No.: 54,729

[22] Filed: Apr. 28, 1993

[51] Int. Cl.[5] .............. B32B 35/00

[52] U.S. Cl. .............. 156/344; 156/584; 254/200; 254/202; 254/262; 294/8.6; 294/103.1; 294/119.1; 294/902

[58] Field of Search .............. 156/344, 584; 254/199, 254/200, 202, 203, 209, 211, 213, 219, 227, 242, 262; 294/8.6, 103.1, 119.1, 902

[56] References Cited

U.S. PATENT DOCUMENTS

| | | | |
|---|---|---|---|
| 141,446 | 8/1873 | Lindsay | 294/8.6 X |
| 2,555,430 | 6/1951 | Weeks | 294/103.1 X |
| 4,330,938 | 5/1982 | Martin . | |
| 4,332,371 | 6/1982 | Bell et al. . | |
| 4,399,954 | 8/1983 | Arrant . | |
| 4,533,118 | 8/1985 | Thomas et al. . | |
| 4,560,146 | 12/1985 | Thomas et al. | 156/344 X |
| 5,219,366 | 6/1993 | Scribner | 294/103.1 X |

*Primary Examiner*—Mark Osele
*Attorney, Agent, or Firm*—Hovey, Williams, Timmons & Collins

[57] ABSTRACT

An improved carpet stripping device (10) designed for rapid, easy removal of adhesively secured carpeting is provided which includes an elongated cable or line (12) connected at one end thereof to a powered winch assembly (14). The opposite end of the line (12) is connected with an improved carpet connection assembly (16) allowing ready and secure connection to a pulled margin (60) of the carpeting to be stripped. The assembly (16) includes a stretch of flexible cable (50), together with a pair of spaced apart, carpet margin-gripping jaw members (42, 44) positioned on the cable (50) and shiftable along the length thereof. In use, the assembly (16) is initially positioned on a pulled and slitted margin (60) of carpeting, and is rolled to form an interlocking convolution (66), with the cable (50) extending through the carpet slit (62). The attached assembly (16) is then coupled with the line (12) for carpeting stripping operations.

1 Claim, 2 Drawing Sheets

CARPET STRIPPING DEVICE

BACKGROUND OF THE INVENTION

1. Field of the Invention

The present invention is broadly concerned with an improved carpet stripping device capable of cleanly stripping large sections of adhesively-secured carpet from various substrates. More particularly, the invention pertains to such a carpet stripping device, as well as a method of carpet stripping, wherein an improved gripping assembly is employed for coupling a cable to a margin of the carpet to be stripped; the cable is connected to a powered winch assembly so that, upon operation of the winch, the carpet is stripped from the underlying substrate.

2Description of the Prior Art

One common method of attaching carpet to substrates such as poured cement floors is through the use of adhesives. This technique is commonly used in installation of carpets in large industrial and commercial areas. A problem arises, however, when it is attempted to remove such adhesively-secured carpet, because of the tenacity of modern-day carpet adhesives. Manual removal of such carpeting is extremely labor-intensive and slow, and therefore expensive. Moreover, such repetitive labor can lead to worker injury.

In response to this long standing problem, attempts have been made to provide mechanical devices to aid in stripping of adhesively-secured carpeting. For example, U.S. Pat. Nos. 4,560,146 and 4,533,118 describe an assembly including a winch and cable connected to an endmost carpet gripping head. The latter is of complex construction and includes a pair of jaws carrying upright pins for impaling the end of a course of carpeting. This carpet gripping assembly is rather complex and the impaling pins present a safety hazard to users. U.S. Pat. No. 4,332,371 to Bell describes another winch-type stripper, but fails to teach any particular carpet-gripping apparatus.

U.S. Pat. No. 4,330,938 describes an alternative approach making use of a drill-powered reciprocal blade assembly designed to segment and strip adhesively-secured carpeting. Another patent of background interest is U.S. Pat. No. 4,399,954.

Many of these prior devices make use of ropes in lieu of metal pulling cables, and these ropes are prone to stretching and breaking.

Despite these prior art attempts, there remains a need for a simplified carpet stripping apparatus making use of an improved carpet gripping assembly free of impaling pins and of construction permitting ready and secure connection of the gripper to a carpet margin.

SUMMARY OF THE INVENTION

The present invention overcomes the problems outlined above, and provides a carpet stripping device in the form of an elongated line or cable operatively connected at one end thereof to a pulling means (e.g., a motorized winch assembly), together with a carpet connection assembly coupled to the opposite end of the line for connection to one margin of a carpet to be stripped. The improved carpet connection assembly includes a stretch of flexible cable, together with a pair of spaced apart, carpet margin-gripping jaw members positioned on the cable and movable along the length thereof. The cable also provides a stop for preventing detachment of the jaw members from the cable during carpet stripping operations.

In preferred forms, the jaw members are of elongated, transversely arcuate, complemental configuration for gripping of a carpet margin therebetween. Most advantageously, the jaw members are of concavo-convex configuration, with the concave surface of one jaw member being adjacent the convex surface of the proximal jaw member.

In use, a margin of the carpet to be stripped is pulled away from the underlying floor or substrate in order to present a pair of opposed faces, and a slit is cut in the margin. The jaw members of the connection assembly are next placed in straddling relationship to the carpet margin, with the jaw members adjacent respective faces of the margin in spanning relationship to the slit and with the cable passing through the slit. Next, the jaw members are moved into engagement with the adjacent faces of the carpet margin, and are rolled in unison with the carpet margin to form a convolution of carpet with the jaw members disposed within the confines of the convolution. An end of the cable is then pulled through the slit and is connected to the winch line. This forms a very secure, positive, self-locking connection between the line and carpet so that, upon operation of the winch, the carpet is cleanly stripped from the substrate.

DETAILED DESCRIPTION OF THE PREFERRED EMBODIMENTS

Figure 1:
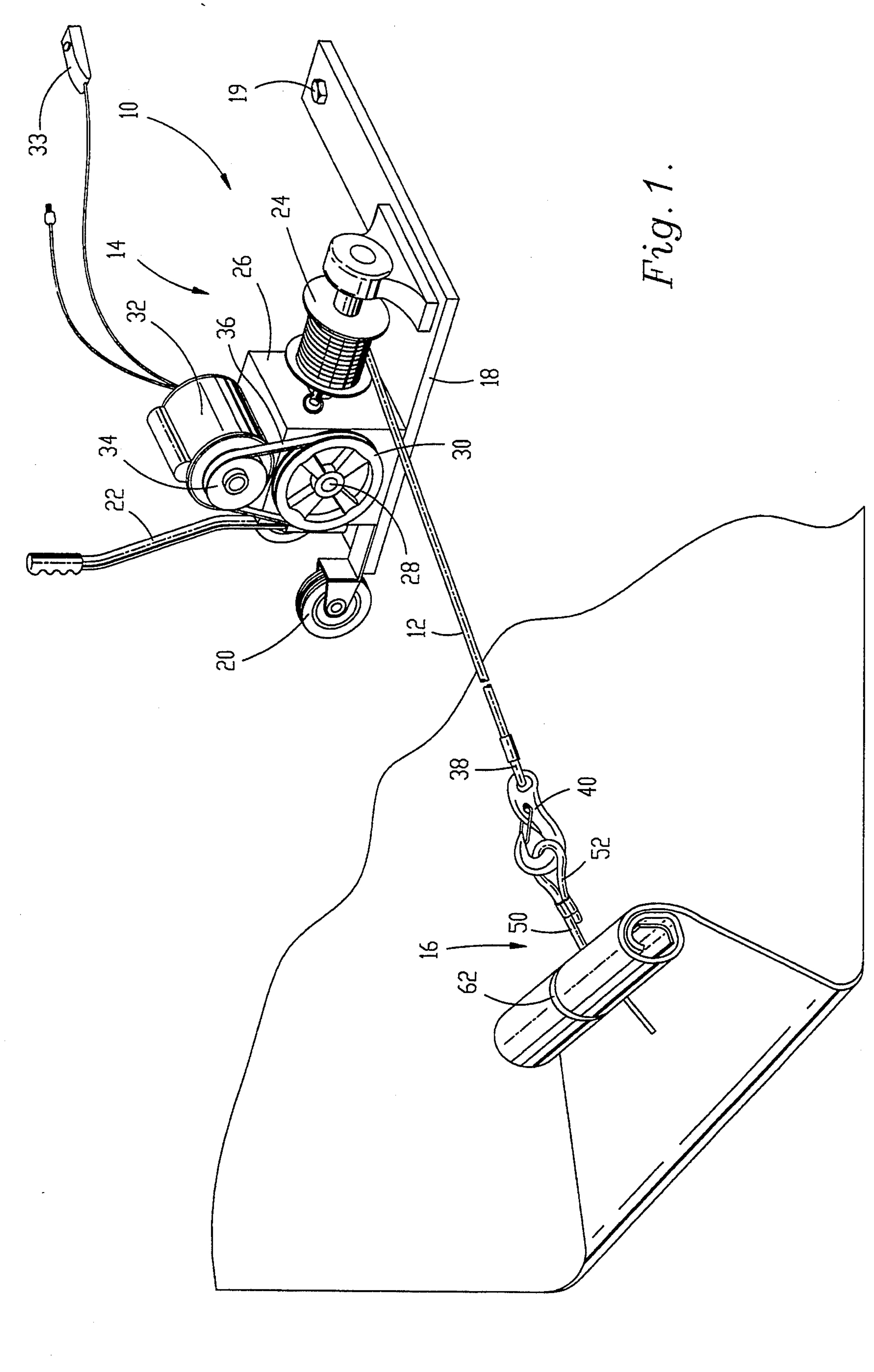
FIG. 1 is an isometric view of the carpet stripping device of the invention, shown with the connection assembly thereof coupled with a margin of carpet to be stripped.

Turning now to the drawings, and particularly FIG. 1, a carpet stripping device 10 is illustrated. Broadly speaking, the device 10 includes an elongated line 12 preferably in the form of steel cable (e.g., 8000 lb. aircraft cable), a motor driven winch assembly 14 connected to one end of the line 12, and a carpet connection assembly broadly referred to by the numeral 16 releasably connected to the other end of the line 12.

In more detail, the winch assembly 14 includes a lowermost, somewhat L-shaped base 18 having a pair of laterally extending wheels 20 affixed to one end thereof, with an upright handle 22 secured between the wheels 20 as shown. In addition, the base 18 carries an attachment pin 19 and supports a rotatable winch reel 24 onto which cable 12 is wound. The reel 24 is in turn operably connected with the output of a double worm reducer gear box 26, e.g., having a 100:1 ratio. The input shaft 28 of the gear box 26 supports a pulley 30, and a $\frac{1}{3}$ horsepower motor 32 having an output pulley 34 is affixed to the top of the gear box. The motor 32 is equipped with the usual power cord (not shown) as well as a 6′ electrical line having a pressure-type safety switch 33 designed to be actuated by hand or foot pressure. A belt 36 serves to interconnect the pulleys 30, 34 as shown. As those skilled in the art will appreciate, actuation of motor 32 operates via the described belt and pulley system and gear box 26 to rotate reel 24; this in turn serves to retract line 12 during carpet stripping operations.

The end of line 12 opposite reel 24 includes an eye 38 supporting a connection hook 40 having a spring-loaded safety latch. The hook 40 in turn permits selective and releasable connection of the assembly 16 with line 12.

Figure 4:
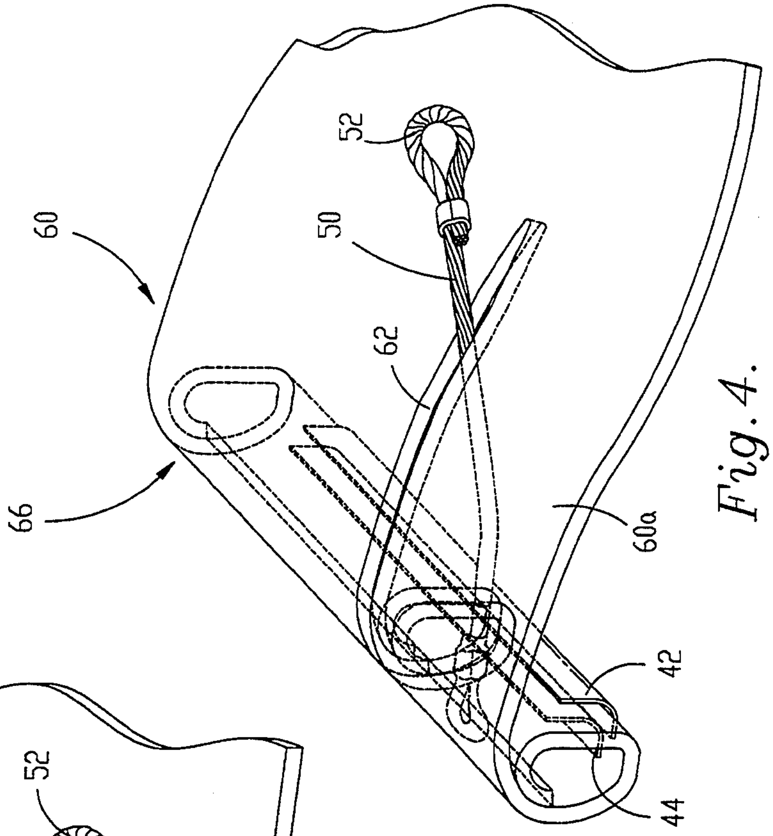
FIG. 4 is a view similar to that of FIGS. 2–3, but illustrating the final orientation of the connection assembly wherein the carpet-gripping jaws are within a convolution of carpeting and the cable is passed rearwardly through the margin slit.
Figure 2:
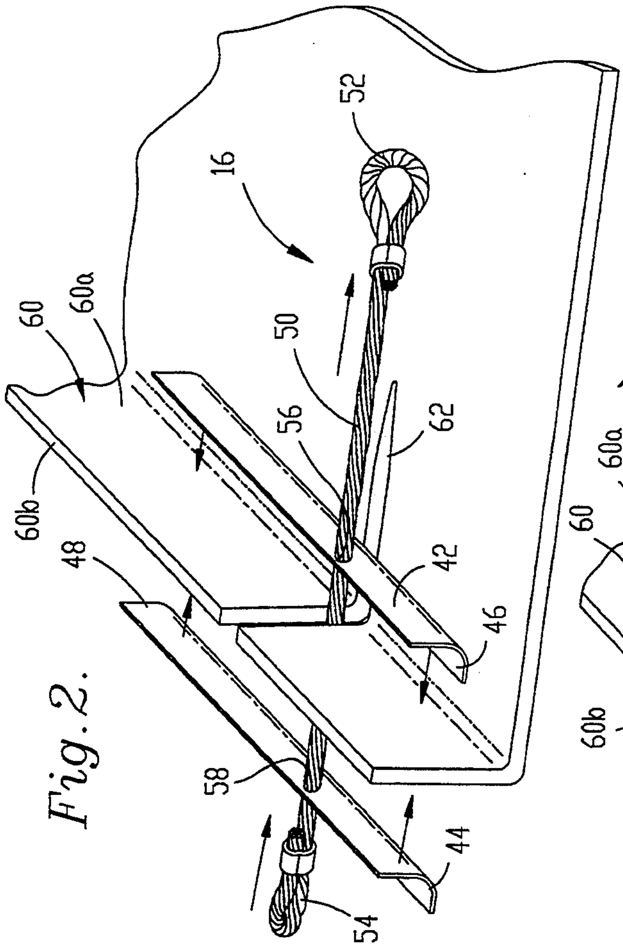
FIG. 2 is a fragmentary view illustrating initial placement of the jaws of the carpet connection assembly on opposite sides of the slitted margin of a carpet to be stripped.
Figure 3:
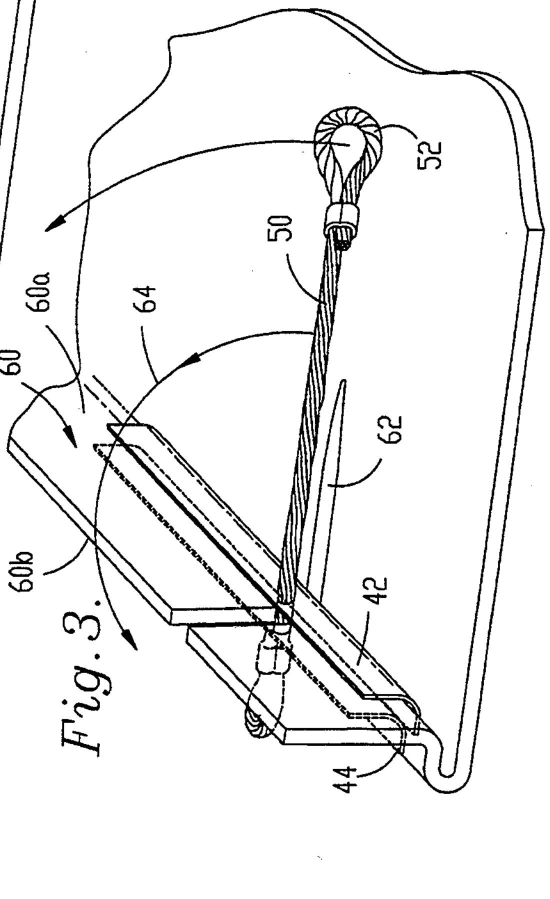
FIG. 3 is a view similar to that of FIG. 2, but illustrating the next step in the use of the connection assembly wherein the carpet-gripping jaws are placed in engagement with opposite faces of the carpet margin.

Attention is next directed to FIGS. 2–4 which illustrate the construction and use of carpet connection 16. In particular, the assembly 16 includes a pair of elongated metallic carpet-gripping jaw members 42, 44 which are of complemental configuration. These members may be of right angle configuration in cross-section, or concavo-convex as specifically depicted. Note that the concave face 46 of jaw member 42 is adjacent the convex face 48 of jaw member 44. A short stretch of cable 50 also forms a part of the assembly 16, and is preferably ⅜″ metallic aircraft cable having a pair of endmost eyes 52, 54, the latter serving as a stop for preventing detachment of the jaw members 42, 44 from the cable 50 during carpet stripping operations. As illustrated, the jaw members 42, 44 are apertured as at 56 and 58, and are positioned on the cable 50 for slidable movement along the length thereof.

In operation, the base 18 is first secured to the underlying floor or substrate. This involves preliminarily placing the winch assembly 14 at an appropriate location, and drilling or otherwise forming a hole in the substrate. The pin 19 is then used to secure base 18 to the floor.

In the next step, the carpet connection assembly 16 is affixed to a margin 60 of the carpet to be stripped. Referring specifically to FIG. 2, the margin 60 is first manually pulled from the substrate in order to present a pair of opposed upper and lower carpet faces **60*a*, 60*b*. Next, an elongated slit 62 is formed in the margin as shown. The assembly 16 is then secured to the margin 60. This involves first placing the jaw members 42, 44 on opposite sides of the margin 60, with the cable 50 within slit 62. As illustrated in FIG. 2, the convex surface 48 of jaw member 44 is positioned adjacent lower margin face 60*b*, whereas concave surface 46 of jaw member 42 is adjacent face 60*a*. The two jaw embers are then slid along cable 50 to assume the FIG. 3 position, i.e., the complementary jaw members 42, 44 are respectively in engagement with the margin surfaces 60*a*, 60*b***.

In the next step, the jaw members 42, 44 and margin 60 are grasped, and rolled in the direction of arrow 64 to form at least one convolution 66 of carpeting, with the jaw members located within the confines of the convolution. At the same time, the end of cable 50 remote from the jaw members is rotated and pulled upwardly through slit 62.

The operator next interconnects line 12 with eye 52 of cable 50, through the use of hook 40 (see FIG. 1). The motor 32 is then activated in order to retract and roll up line 12 on reel 24. Pressure switch 33 must be depressed during motor operation, and the latter will not permit motor operation in the absence of actuation of the switch 33. This serves to strip the carpeting from the underlying substrate. By virtue of the secure interconnection to the carpeting afforded by assembly 16, the entire span of carpeting can be readily stripped, even though adhesively secured to the underlying floor.

Those skilled in the art will appreciate that device 10 can be readily moved from place to place through use of handle 22 and wheels 20, and that the described operation presents a number of advantages which cannot be duplicated in prior devices of this type.

We claim:

1. A method of stripping carpet from a substrate, comprising the steps of:
   - pulling a margin of said carpet away from said substrate to present a pair of opposed faces, and forming a slit in the margin;
   - providing a carpet connection assembly including a stretch of flexible cable and a pair of elongated, spaced apart, carpet margin-engaging jaw members positioned on said cable and movable along the length thereof;
   - positioning said jaw members adjacent respective faces of said pulled carpet margin in spanning relationship to said slit, with said cable passing through said slit;
   - moving each of said jaw members into engagement with the adjacent face of said margin, and rolling said jaw members in unison with said margin to form a convolution of carpet with said jaw members within the confines of said convolution, and pulling an end of said cable through said slit;
   - connecting said end of said cable to means for pulling the cable and said jaw members; and
   - operating said pulling means to strip the remainder of said carpeting from said substrate.

* * * * *